INVENTOR
Norman F. Brown

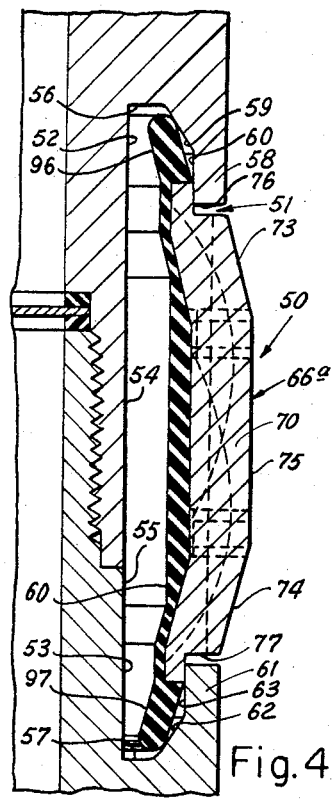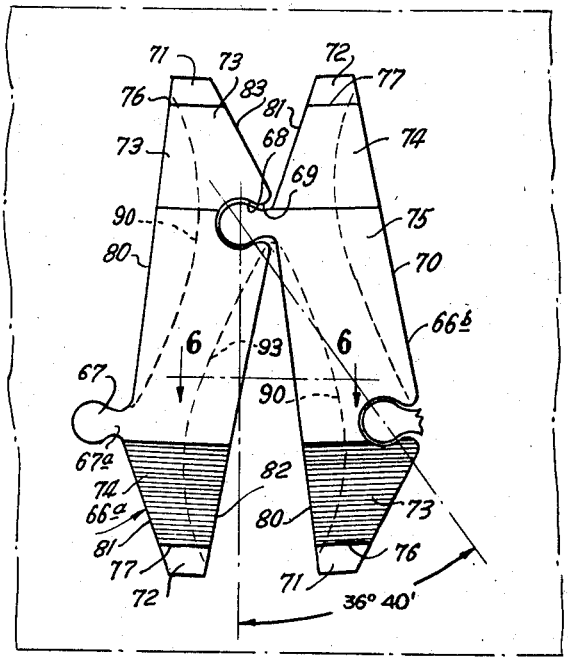
Fig. 4
Fig. 5
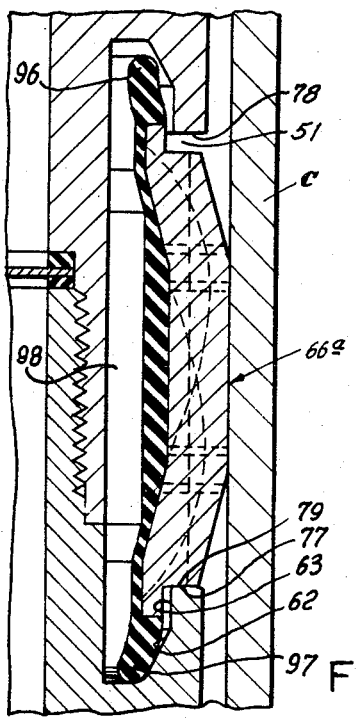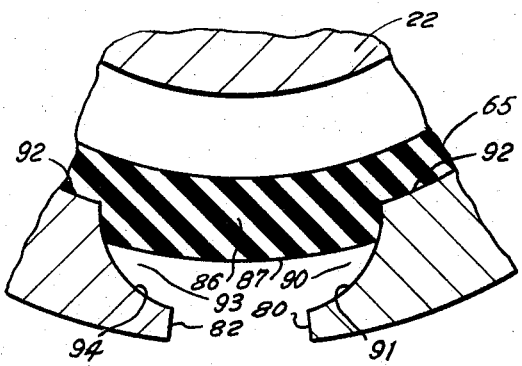
Fig. 7
Fig. 6
INVENTOR
Norman F. Brown Jan. 7, 1969   N. F. BROWN   3,420,928
METHOD OF PRODUCING SEALS
Original Filed Sept. 27, 1963

INVENTOR
Norman F. Brown
BY
ATTORNEYS

Jan. 7, 1969  N. F. BROWN  3,420,928
METHOD OF PRODUCING SEALS
Original Filed Sept. 27, 1963  Sheet 4 of 5
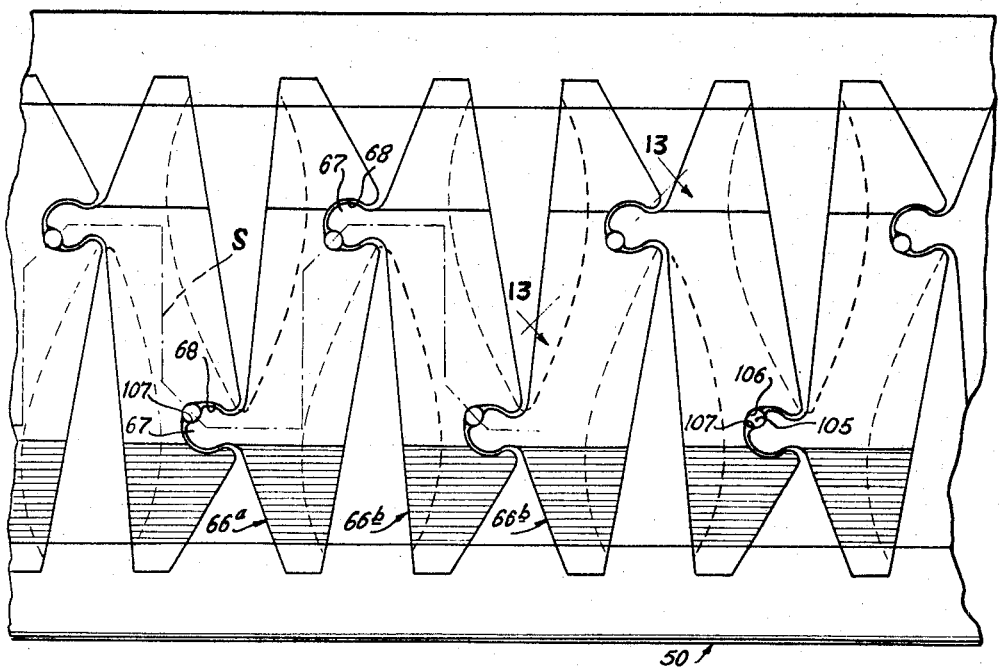
Fig. 12
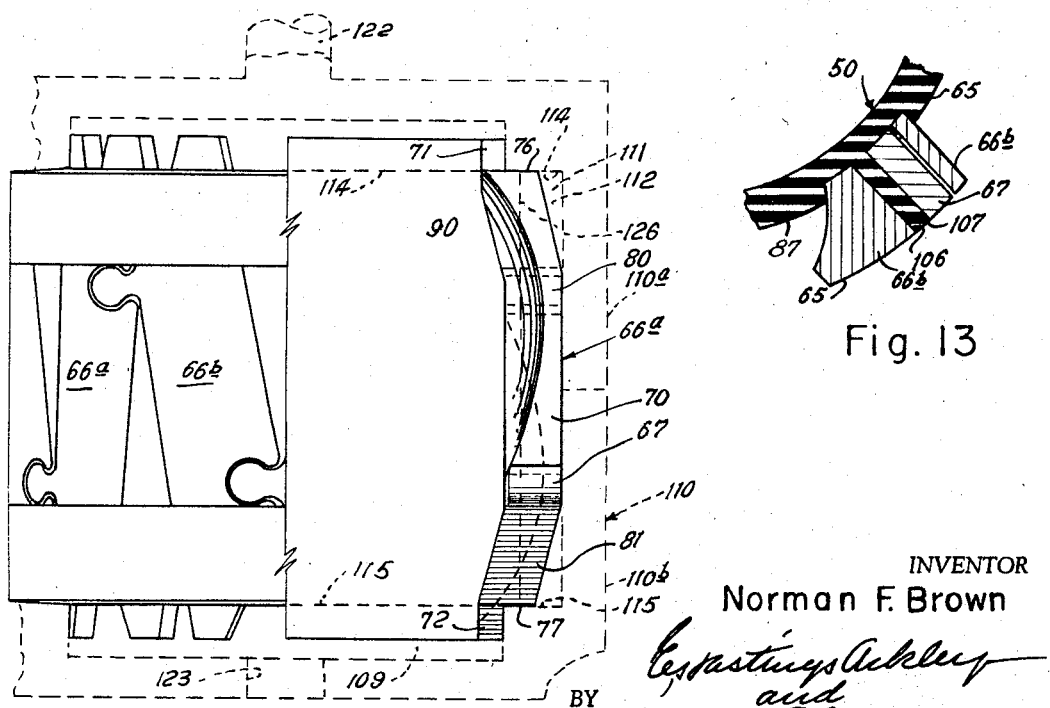
Fig. 13
Fig. 14
INVENTOR
Norman F. Brown
BY
ATTORNEYS Jan. 7, 1969

N. F. BROWN 3,420,928

METHOD OF PRODUCING SEALS

Original Filed Sept. 27, 1963

INVENTOR
Norman F. Brown

BY *Hastings Ackley*
and
*Walter J. Jayne*

ATTORNEYS

United States Patent Office 3,420,928
Patented Jan. 7, 1969

3,420,928
METHOD OF PRODUCING SEALS
Norman F. Brown, Dallas, Tex., assignor to Otis Engineering Corporation, Dallas, Tex., a corporation of Delaware
Original application Sept. 27, 1963, Ser. No. 312,175. Divided and this application July 15, 1966, Ser. No. 604,077
U.S. Cl. 264—261    5 Claims
Int. Cl. B29d 9/00; B29c 5/04

This is a division of application Ser. No. 312,175, filed Sept. 27, 1963 and now abandoned.

This invention relates to the method of producing seals.

An object of the invention is to provide a new and improved method of producing an annular seal having a plurality of annularly arranged and pivotally connected rigid segments embedded in an annular resilient body, the segments having boss portions extending outwardly of the external annular surface of the resilient body, which does not require the use of complicated or expensive dies or molds.

Still another object is to provide a new and improved method of producing a seal which includes the steps of pivotally connecting a plurality of segments in a continuous circular band, positioning the band segments in a rotatable mold which holds the band in a circular form of a predetermined diameter, introducing a predetermined quantity of a liquid filler substance of relatively low melting point into the mold while the latter is rotating to cause the liquid substance to be moved outwardly by centrifugal force into the interstices between adjacent outer portions of the segments, rotating the mold until the liquid filler substance solidifies and forms with the segments a rigid annular body and provides internal surfaces between adjacent segments spaced outwardly of the inner surfaces of the segments, placing the annular body in a mold, molding an inner annular resilient body to the internal and side surfaces of the segments not shielded by the filler substance by introducing a liquid substance into the mold which solidifies to form the resilient body, removing the assembly of the resilient body, the segments and the filler substance from the mold and then heating the assembly of the filler material, the segments and the resilient substance to a temperature above the melting temperature of the filler substance but below that which can harmlessly be withstood for a short time by the already cured resilient substance or which could have any undesirable effect on the segments to melt the filler substance from such assembly leaving an annular seal whose resilient annular body permits movement of the segments relative to one another.

Additional objects and advantages of the invention will be readily apparent from the reading of the following description of a device constructed in accordance with the invention, and reference to the accompanying drawings thereof, wherein:

FIGURE 4 is a fragmentary enlarged partly sectional view of the well tool showing the seal in its fully expanded position relative to the body of the well tool prior to the insertion of the well tool into the flow passage of the flow conductor for longitudinal movement therethrough;

FIGURE 5 is a planar development view showing the position of a pair of the segments of the seal illustrated in FIGURE 4 when the seal is in its fully expanded position on the well tool body;

FIGURE 6 is a sectional view taken on line 6—6 of FIGURE 5;

FIGURE 7 is a fragmentary vertical sectional view showing the well tool being moved downwardly through a portion of a well flow conductor of normal internal diameter and with a downwardly acting pressure differential exerted across the partially retracted seal;

FIGURE 12 is a fragmentary planar development view of a modified form of the seal embodying the invention;

FIGURE 13 is a sectional view taken on line 13—13 of FIGURE 12;

FIGURE 14 is a horizontal fragmentary partly sectional view formed of the segments and filler substance in a centrifugal mold, the mold being shown in section and showing the manner in which the filler substance fills the interstices between extreme outer portions of adjacent segments, one of the segments being shown in side elevation in the mold.

Figures 1, 2, 3:
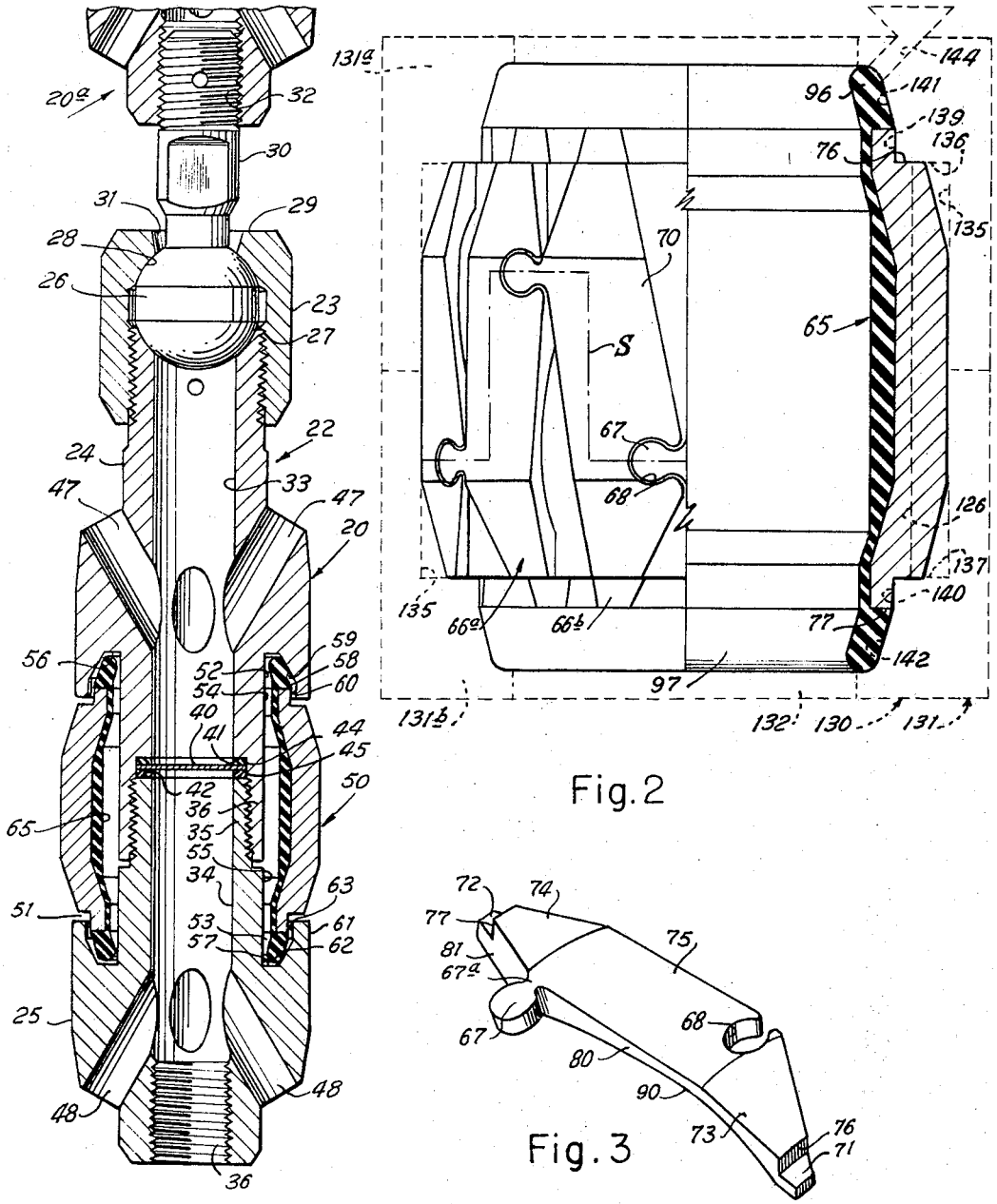
FIGURE 1 is a vertical section view of a well tool embodying the invention connected in a string of well tools.
FIGURE 2 is an enlarged vertical, partly sectional view of the seal of the well tool illustrated in FIGURE 1 and showing in phantom the mold in which the resilient annular body is formed and molded to the segments of the seal.
FIGURE 3 is a perspective view of one of the segments of the seal.
Figure 8:
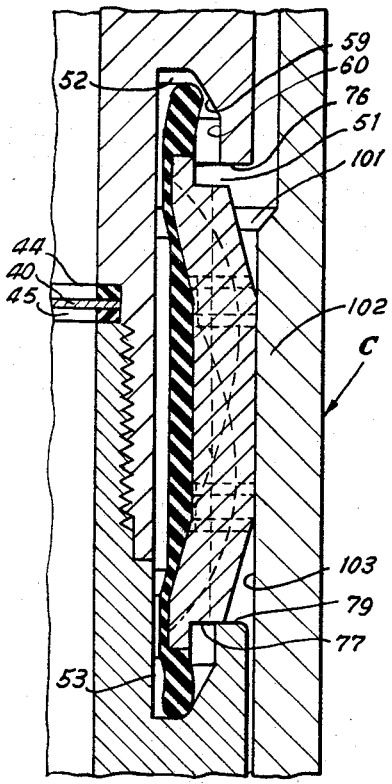
FIGURE 8 is a view similar to FIGURE 7 showing the seal passing through a portion of the well flow conductor of restricted internal diameter and with the seal in substantially fully retracted position.
Figure 9:
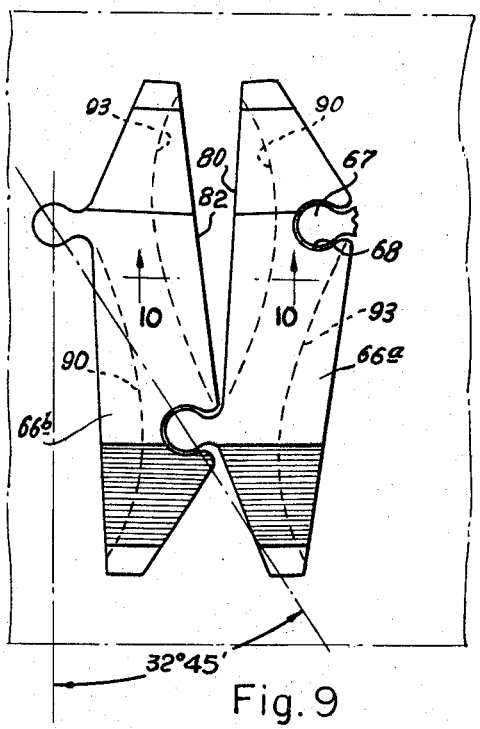
FIGURE 9 is a development view showing the relative positions of a pair of the segments of the seal when the seal is in the substantially fully retracted or contracted position illustrated in FIGURE 8.
Figures 10, 11:
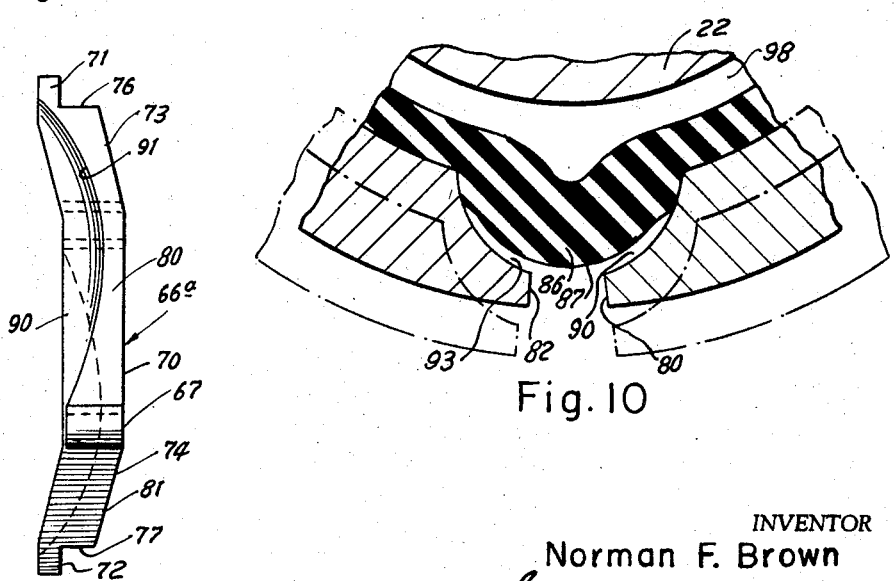
FIGURE 10 is a sectional view taken on line 10—10 of FIGURE 9.
FIGURE 11 is a side view of one of the metal segments of the seal.

Referring now particularly to FIGURE 1 through 11 of the drawing, the well tool 20 there illustrated may be employed to move other well tools through a flow conductor by a pressure differential exerted thereacross, as by pumping fluid into one end of the flow conductor in which such well tool 20 and any tools connected thereto are disposed.

The well tool 20 includes a body 22 having a top swivel cap 23 and top and bottom seal retainer sections 24 and 25. A swivel ball 26 is movably positioned between the annular arcuate surface 27 at the upper end of the top retainer section and an opposed annular arcuate surface 28 of the internal annular flange 29 of the swivel cap. The shank 30 of the swivel ball extends through the aperture 31 of the swivel cap defined by its internal annular flange and its upper end portion is threaded and receivable in a threaded bore 32 in the lower end of any other well tool, such as another well tool 20a which is identical in structure to the well tool 20.

The top and bottom seal retainer sections are tubular in form and have longitudinal flow passages 33 and 34 extending therethrough. The reduced upper end portion 35 of the bottom retainer section is threaded in the lower end portion 36 of the top retainer section. The lower end of the flow passage 34 of the bottom retainer section is threaded, as at 32, to permit connection of a well tool to the lower end of the body.

A frangible closure disk 40 is positioned between the oppositely facing annular shoulders 41 and 42 of the top and bottom retainer sections and a pair of annular resilient seal rings 44 and 45 are interposed between the peripheral top and bottom surfaces of the frangible disk and the shoulders 41 and 42 respectively, to seal therebetween.

The closure disk prevents communication between the longitudinal passages of the retainer sections and therefore between lateral ports 47 and 48 of the top and bottom retainer sections respectively which communicate the longitudinal passages 33 and 34 with the exterior of the body above and below, respectively the annular seal 50 carried by the body.

The annular seal 50 is disposed in an external annular recess 51 of the body and its upper and lower end portions are received in the top and bottom grooves 52 and 53 of the body which open downwardly and upwardly, respectively, into opposite annular ends of the external annular recess. The external recess and the top and bottom grooves are provided by the top and bottom retainer sections whose external vertical surfaces 54 and 55, respectively, define the inner vertical cylindrical side of the external recess and the outwardly facing vertical annular inner sides of the grooves and whose downwardly and upwardly facing annular surfaces 56 and 57 define the annular top and the bottom of the grooves 52 and 53, respectively. The outer side of the top groove which is formed by the annular downwardly extending flange 58 of the upper retainer section which has an internal outwardly and downwardly extending or beveled annular seal surface 59 which extends outwardly and downwardly from the outer end of the top surface 56 and an annular vertical inwardly facing stop surface 60. The outer side of the bottom groove is similarly defined by the upwardly extending annular flange 61 of the bottom retainer section which provides an upwardly and outwardly extending inwardly facing annular seal surface 62 and an annular vertical inwardly facing stop surface 63.

The annular seal 50 includes an annular resilient body 65 in which are embedded, and bonded thereto, the inner portions of a plurality of segments 66a and 66b of wear resistant substance, such as metal or the like. The identical segments 66a have configurations which are mirror images of the identical segments 66b. The segments of the seal are positioned in annular array or alignment with each segment 66a disposed between and pivotally connecting a pair of the segments 66b and with each segment 66b disposed between and pivotally connecting to a pair of the segments 66a. Each adjacent complementary pair of segments 66a and 66b are pivotally connected by means of a lateral pin or pivot section 67 of circular configuration, connected by a neck 67a to one longitudinal side of one of the segments of the pair disposed in a circular socket 68 of the other segment of the pair which opens through a slot 69 in a longitudinal side of the other segment facing the longitudinal side of the segment having the pin 67. The neck 67a by which the circular pin 67 is secured to the longitudinal side of its segment in laterally or circumferentially spaced relation thereto, is smaller in width than the width of the slot 69 in which it is disposed so that each adjacent pair of segments connected by such pin and socket connections thereof are pivotally movable relative to each other through a limited range or distance about the axis of rotation of the pin and the socket. The axis of rotation of the pin and socket of a connected pair of segments 66a and 66b does not intersect the central axis of the seal but is parallel to a radial line perpendicular to the central axis of the seal.

The bosses 70 of the segments extend radially outwardly of the external surface of the body through the external recess of the body of the well tool to engage the internal surfaces of a flow conductor C through which the well tool is movable. Each segment has opposite end portions 71 and 72 positioned inwardly of the ends of the outwardly divergent beveled shoulders 73 and 74 of the bosses which extend in opposite longitudinal directions from the vertical arcuate outer seal surfaces 75 of the bosses. The end stop portions of the segments extend into the grooves of the body and their outer surfaces engage the annular stop surfaces 60 and 63 to limit outward movement of the segments relative to the body.

The longitudinal distance between the opposite horizontal end shoulders 76 and 77 of the bosses is smaller than the longitudinal distance between the annular downwardly and upwardly facing shoulders 78 and 79 of the flanges 58 and 61 of the top and bottom retainer sections, respectively, to permit limited longitudinal movement of the seal on the body.

The pin 67 and socket 68 of each segment are located at opposite sides of and spaced longitudinally or vertically from the central horizontal axis of the seal so that each segment is movable about two substantially horizontal radial axes which are spaced both circumferentially and longitudinally. Each segment has a long longitudinal side 80 and a short longitudinal side 81 which extend divergently in opposite longitudinal directions from opposite sides of its pin neck 67a and also has a long longitudinal side 82 and a short longitudinal side 83 which extend divergently longitudinally in opposite directions from opposite sides of the socket slot 69. It will be apparent that the long side 80 and the short side 83 of each segment extend longitudinally convergently in one direction to one end of the segment and the short side 81 and the long side 82 thereof extend longitudinally convergently in the opposite direction to the other end of the segment.

The resilient annular body 65 has circumferentially spaced outer portions 86 which extend radially outwardly into the interstices between adjacent sides of adjacent segments and longitudinally between the end shoulders 76 and 77 of the bosses thereof. The external surfaces 87 of such outer portions of the resilient body are spaced inwardly of the seal surface 75 and of the beveled shoulders 73 and 74 of the bosses so that no portion of the resilient body extends outwardly of the external recess 51.

Each segment has an internal arcuate recess 90 which extends longitudinally from adjacent its pin 67 to a point adjacent one end thereof and opens laterally outwardly at the side 80 thereof and which is defined by the arcuate surface 91 which curves outwardly and laterally from the inner surface 92 of the segment to the side 80 thereof. Each segment also has an arcuate recess 93 which extends longitudinally from adjacent its neck 69 to a point adjacent its upper end and which opens laterally outwardly at the long longitudinal side 82 thereof and is defined by the arcuate surface 91 which curves outwardly and laterally from the inner surface 92 to the side 80. The long sides 80 and 82 of each pair of adjacent segments 66 extend divergently in one longitudinal direction with their recesses 90 and 93 facing each other so that the arcuate recesses into which the outer portions 86 of the resilient body extend provide space for the substance of the resilient body to move outwardly as such segments pivot about their pin and socket connections to move their long sides 80 and 82 toward each other as the seal is contracted inwardly into the external recess 51 of the body. The short longitudinal sides 81 and 83 of adjacent pivotally connected segments which extend divergently in the opposite longitudinal direction simultaneously pivot or move away from each other about the axis of the pin 67, the resilient substance of the body therebetween stretching to permit such movement.

The resilient body 65 has top and bottom annular resilient lips 96 and 97 which extend longitudinally outwardly of opposite ends of the segments disposed in the top and bottom grooves 52 and 53, respectively, of the body. The lips are adapted to sealingly engage the seal surfaces 59 and 62 respectively. When the seal is in its lowermost position in the external recess with its downward movement on the body limited by the engagement of the shoulders 76 and 77 of the bosses 70 with the upwardly facing annular stop shoulder 79, the bottom lip 97 is in engagement with the seal surface 62 and the upwardly facing annular surface 57 and the top lip 96 is positioned below the annular downwardly facing surface 56 to permit flow of fluid into the upper end of the annular chamber or space 98 between the seal and the external surfaces 54 and 55 of the body.

When the seal 50 is in this lower position and the pressure in the flow conductor exteriorly of the body and above the seal is greater than the pressure exteriorly of the body below the seal, the fluid pressure from above the seal communicated to the upper end of the chamber 98 holds the bottom lip in sealing engagement with the surface 62 and biases the resilient body 65 and the segments 66 outwardly, and the segments into engagement with the internal surfaces of the flow conductor. Conversely, when the pressure in the flow conductor below the seal is greater than the pressure in the flow conductor thereabove, the seal is moved to its upper position on the body wherein the top stop shoulders 76 and 77 of the seal segments engage the downwardly facing annular shoulder 78 of the upper retainer section and the bottom lip is out of engagement with the upwardly facing annular surface 57 to facilitate communication of pressure from below the seal into the lower end of the chamber 98 which holds the top lip 96 in sealing engagement with the internal surfaces of the flow conductor.

In use, when it is desired to move a tool, such as a valve, plug or the like, through a well flow conductor by means of a fluid pumped into one end of the flow conductor, such tool is connected to the lower end of the body 22 of the well tool 20 by means of the lower threaded end portion of the longitudinal bore or passage of the lower retainer section. Another well tool 20a identical in structure to the well tool 20 is preferably connected to the upper end of the body of the well tool 20 by means of the shank of the swivel ball of the well tool 20 received in the threaded portion 32 of the bore of the bottom retainer section of the body of the well tool 20a. The seals of the two well tools 20 and 20a are longitudinally spaced to span any internal recesses of the flow conductor, such as the usual coupling or collar recesses thereof. If such coupling recesses are of considerably greater width and height than the outwardly projection portions of the bosses, when the seal is in its fully expanded position and the bosses move outwardly into such recess, the sealing engagement between the seal and the flow conductor would be lost and the pumped fluid could bypass the seal by flowing therepast through such coupling recess and the force of the pumping fluid would not be effective to move the well tool 20 further downwardly in the flow conductor. If two longitudinally spaced well tools 20 and 20a are employed, at least one is always in operative position closing the annulus.

The swivel connection between the two well tools 20 and 20a permits pivotal movement of one relative to the other during the movement of the well tools through curved, angled, or nonlinear portions of the flow conductor. The connection between the tool connected to the lower end of the well tool 20 may also include a swivel connection for this purpose.

The seal 50 of each well tool 20 and 20a, due to the resilient force of the annular resilient body thereof, assumes the fully expanded position illustrated in FIGURE 4 of the drawing wherein the bosses 70 thereof protrude outwardly of the body 22 and their outward movement is limited by the engagement of their shoulders 60 and 63 of the body toward which they are resiliently biased by the somewhat compressed resilient body so that the outer surfaces 75 of the bosses lie in a substantially cylindrical plane of greater diameter than the normal internal diameter of the flow conductor.

The assembly of the well tools 20 and 20a and the well tool connected to the lower end of the well tool 20 is then inserted into the flow conductor and fluid is pumped into the flow conductor at the surface of the well to move the assembly through the flow passage of the flow conductor C. As each of the well tools 20 is inserted into the flow conductor, its seal 50 is cammed inwardly toward a partly contracted or retracted position, FIGURE 7, the camming engagement of the downwardly facing beveled shoulders 74 and 73 of the segments 66a and 66b with the internal surfaces of the flow conductor facilitating such insertion of the well tools into the flow passage of the flow conductor and the movement of the seals past any obstructions of the flow conductor, such as the upwardly facing annular shoulder 101, FIGURE 8, at the upper end of the portion 102 thereof of decreased internal diameter. As the seal 50 is moved to such partly contracted or retracted position, the outer portion 86 of the resilient body between the facing sides 80 and 82 of adjacent segments may deform outwardly into the recesses 90 ad 93 thus preventing undue compression and damage to the resilient body.

When the seal 50 is in its normal operative position in a well flow conductor illustrated in FIGURE 7, the arcuate surfaces 75 of the bosses of the segments and the outer surfaces of the pin 67 and pin neck 67a thereof constitute sections of and lie in a cylindrical plane whose diameter is substantially equal to the normal internal diameter of the flow conductor and such surfaces sealingly engage the internal surfaces of the flow conductor along a substantially continuous line S, FIGURE 2, which extends circumferentially across the outer surfaces 75 of the bosses and the outer surfaces of the pin and pin neck of each segment. The only gaps in this line of sealing engagement may occur between the surfaces defining the sockets 68 and the adjacent and contacting outer surfaces of the pins disposed therein. Any such gaps whose width is exaggerated in the drawings for clarity of illustration of the structure of the segments, are of extremely small orifice so that the seal effectively closes the annulus betwen the flow conductor and the body 22 on which it is mounted and any small leakage of fluid past the seal through such gaps does not decrease to any appreciable degree of the efficiency of the well tool 20.

When the seal is in its fully expanded position on the body, FIGURE 4, the angle between the axes of pivotal movement of adjacent segments about the axes of the pivotal connection thereof may be approximately 36° 40′ and the outer portions 86 of the resilient body 65 which extend between the side surfaces of the segment and in the arcuate recesses 90 and 93 of adjacent segments are not deformed outwardly to any appreciable degree, FIGURE 6. It will be apparent that said angle may widely depend on the distance between the two axes of pivotal movement of the segments and the number of segments.

During the movement of the seal to its partly contracted or retracted position illustrated in FIGURE 7, each complementary pair of connected segments 66a and 66b pivots about its pin and socket connection in such direction that the adjacent facing side surfaces 80 and 82 of the two segments move toward each other and the adjacent facing the side surfaces 81 and 83 thereof pivot away from each other. It will be apparent that each of the segments 66a rotates in a counter-clockwise direction, FIGURE 5, about the longitudinally and circumferentially spaced axes of its pivotal connections with the adjacent segments 66b betwen which it is positioned and that simultaneously each segment 66b pivots in a clockwise direction about the longitudinally and circumferentially spaced axes if its pivotal connections with the segments 66a between which it is positioned.

As the pressure in the flow passage of the flow conductor above the well tool 20 is increased, due to the pumping of fluid into the flow conductor, to a value which exceeds the pressure in the flow conductor below the well tool, its seal 50 is moved downwardly on the body until the lower shoulders 77 and 76 of the segments 66a and 66b respectively engage the upwardly facing shoulder 79 of the bottom retainer section. During such downward movement of the seal on the body, the top annular lip 96 of the annular resilient body 65 moves out of engagement with the downwardly facing annular shoulder 56 and the seal surface 59 of the top retainer section and the bottom lip 97 moves into engagement with the upwardly facing annular shoulder 57 and with the seal surface 62 of the bottom retainer section. The top lip is thus spaced from the seal surface and freed to flex inwardly to permit the fluid pressure in the flow conductor from above the seal to be communicated to the upper end of the annular chamber 98. Such fluid pressure acting on the internal surfaces of the resilient body biases the segments outwardly into engagement with the internal surfaces of the flow conductor and at the same time biases the bottom lip into sealing engagement with the seal surface 62 to close the lower end of the chamber 98 and prevent flow of fluid therefrom to the exterior of the well tool below the seal. The seal thus closes the annulus between the flow conductor and the body 22 on which the seal is mounted and the downwardly acting force of the pressure differential across the well tool 20, as fluid is pumped into the flow conductor, moves the well tools 20 and 20a and any other tool or tools connected there to downwardly through the flow conductor. It will be apparent that the greater the pressure differential across the seal, the greater is the force with which the bottom lip is biased and held in sealing engagement with the seal surface 62 and the greater the force with which the segments 70 are biased outwardly and held in engagement with the internal surfaces of the well flow conductor thus ensuring proper closure of the annulus between the well tool body and the well flow conductor regardless of the magnitude of the pressure differential which may be needed to move a particular assembly of tools through the flow conductor.

Since only the outer surfaces of the bosses and of the pins and pin necks of the segments, which are made of a hard wear resistance substance, such as a metal alloy, engage the internal surfaces of the well flow conductor, the well tool may be moved great distances through a flow conductor while maintaining proper sealing contact therewith without undue wear or damage to the seal.

When any such well tool 20 or 20a reaches an internal obstruction of the well tool which reduces the internal diameter thereof as, for example, the upwardly facing shoulder 101 of the portion 102 of the flow conductor, the camming engagement of the downwardly facing beveled shoulders 74 and 73 of the segments 66a and 66b, respectively, with such shoulder causes further radial contraction or retraction of the seal and further pivotal movement of the segments about their pin and socket connections.

Such contraction or retraction of the seal is facilitated, as explained above, by the space provided by the arcuate recesses 90 and 93 of adjacent complementary links 66a and 66b into which the substance of the resilient body and of its outer portions 86 may deform outwardly as it is compressed due to the radial contraction of the seal. This further inward or retracing movement of the segments decreases the effectiveness of the sealing engagement of the seal with the internal surface 103 of the portion 102 of the flow conductor since the surfaces of the boss, the pin 67 and the pin neck 67a of each segment is substantially equal to the radius of curvature of the internal surfaces of the well flow conductor at portions thereof of normal internal diameter and is therefore greater than the radius of curvature of the internal surfaces 103 of the portion 102. The increased leakage of the pumped fluid past the seal during the movement of the wall tool through such reduced internal diameter of the flow conductor is quite small and is not of any appreciable import since the rate of introduction or pumping of the fluid into the flow conductor greatly exceeds any such increased rate of leakage of the fluid past the seal.

In addition, since usually at least two well tools 20 and 20a are connected together and are spaced longitudinally any desired distance, it is very unlikely that both will at the same time be in such portion of restricted diameter so that at least one of such well tools will at all times provide an optimum seal with the flow conductor and closure of the annulus.

The assembly of the well tools may thus be moved downwardly by the introduction of fluid under pressure, as by pumping, into the flow conductor until the tool connected to the lower end of the body of the well tool 20 reaches a desired predetermined position in the well flow conductor. Such tool may have a locking means for locking it in position in a predetermined location, recess or nipple of the well flow conductor and have release means which permit the disconnection of the connecting component thereof connected to the lower end of the body of the well tool 20 so that the well tools 20 and 20a may be moved back upwardly in the flow conductor by an upwardly acting pressure differential leaving such tool locked in the flow conductor at the predetermined location or the whole assembly of tools including such tool connected to the body of the well tool 20 may be moved upwardly by such upwardly acting pressure differential. Such upwardly acting pressure differential, which exerts an upward force on the well tools 20 and 20a may be produced by any suitable means and in any stable manner, as by the pressure of an earth formation in communication with the lower end of the flow passage of the flow conductor when the pressure in the flow conductor above the well tool is decreased below such earth formation pressure, as by reversing the direction of pumped fluid in two flow conductors connected near the bottom of the well. Such upwardly acting pressure differential moves the seals 50 of the well tools 20 and 20a upwardly on their bodies until the upwardly facing shoulders 76 and 77 of their segments 66a and 66b, respectively, engage the downwardly facing shoulders 78 of the well tool bodies. During such upward movement of each seal 50, the bottom lip 97 of its resilient annular body 65 is moved out of engagement with the upwardly facing annular shoulder 57 and the seal surface 60 of the bottom retainer section to permit the fluid pressure from below the seal to be communicated to the lower end of the annular chamber 98. The top lip 96 moves into engagement with the downwardly facing annular surface 56 and the seal surface 59 of the top retainer section so that the pressure from below the seal now holds the top lip in sealing engagement with the seal surface 60 thus closing the upper end of the annular chamber and biases the segments 66 radially outwardly and their outer surfaces into sealing engagement with the internal surfaces of the flow conductor.

The well tool 20 is then moved upwardly through the flow passage of the flow conductor, the upwardly facing beveled shoulders 73 and 74 of the segments 66a and 66b, respectively, facilitating movement of the seal past downwardly facing obstructions of the well flow conductor by camming the seal towards its contracted or retracted position by their camming engagement with such downwardly facing obstructions during upward movement of the tools through the flow conductor.

The frangible disk 40 is provided to permit equalization of pressures across the well tool 20 in the event that the bosses of the segments become lodged or locked in some internal recess or against some internal obstruction of the flow conductor while the seal still closes the annulus between the flow conductor and the body of the tool and the seal and, therefore, the well tool is held against movement from such locked position by the pressure differential existing across the seal and biasing the segments against inward movement. When such pressure differential exceeds a predetermined value which causes the force exerted thereby on the disk to exceed the force necessary to rupture the disk, the disk ruptures and permits fluid to flow through the longitudinal internal flow passages 33 and 34 and the ports 47 and 48 of the top and bottom retainer sections. Once the pressure differential across the well tool has thus been equalized, the well tool can be easily removed from the flow conductor as by a suitable fishing tool or the like lowered into the flow conductor by means of a flexible line, since the seal is no longer held against movement to its retracted position by a pressure differential thereacross.

In the event that the well tool installation is such that fluid can be pumped either into the lower end of the flow conductor or into the upper end thereof thus permitting flow of fluid and movement of well tools in either direction through the flow conductor, the rupturing of the frangible disk 40 re-establishes circulation through the flow conductor in order that a fishing tool may be pumped in the flow conductor to the lodged well tool to engage such well tool and so that the reverse circulation then established through the flow conductor may cause such fishing tool to remove such lodged well tool for the flow conductor.

It will now be seen that a new and improved well tool has been illustrated and described which includes a body having an external annular recess and vertically spaced annular recesses opening into opposite ends of the annular recess to provide internal annular seal surfaces on opposite sides of the external recess which are engageable by annular resilient seal means or lips of an annular seal positionable in the internal recess.

It will further be seen that the body is also provided with annular inwardly facing stop shoulders for engaging end stop portions of a seal disposed in the external recess and with vertically spaced downwardly and upwardly facing shoulders engageable with opposed stop shoulders of the seal for limiting longitudinal movement of the seal on the body.

It will also be seen that the annular seal includes a resilient annular body 65 and a plurality of pairs of complementary links or segments 66a and 66b connected together in a continuous circle and embedded in and bonded to the resilient body, the segments being movably interconnected to permit radial expansions and contraction of the seal.

It will further be seen that each segment is pivotable relative to the segments connected thereto at opposite sides thereof about circumferentially spaced axes which are also spaced from the central plane of the seal which extends perpendicularly to the central longitudinal axis of the seal whereby portions of the segments of each adjacent pair of complementary segments extend in one longitudinal direction from the axes of pivotal connection thereof toward and past the central plane of the seal and move toward each other as the seal is radially contracted while the opposite end portions thereof extend in the opposite direction from such axis and move away from each other as the seal is radially contracted whereby the external diameter of the seal decreases.

It will further be seen that each pair of complementary segments have laterally opening recesses in adjacent sides thereof to receive portions of the resilient body deformed radially outwardly as such sides of the segments move toward each other as the seal is radially contracted.

It will further be seen that the segments have outer surfaces movable into sealing engagement with internal surfaces of a flow conductor to provide a continuous annular line of sealing engagement of the seal with such internal surfaces.

It will further be seen that although this continuous annular line of sealing engagement with the internal surfaces of the flow conductor becomes increasingly imperfect in proportion to the departure of the internal diameter of the flow conductor from the normal, the voids are extremely small and in practice are negligible or can be rendered so by using two longitudinal spaced tools provided with said seals.

It will be further seen that the seal has annular resilient lips on opposite ends thereof for sealing between the body of a well tool on which it is mounted and that the lips are held in sealing engagement with the body by fluid pressure acting in opposite longitudinal directions across the seal whereby the seal functions properly regardless of the direction of the pressure differential thereacross.

Referring now to FIGURES 12 and 13 of the drawing, the seal there illustrated is similar in form and structure to the seal 50 illustrated in FIGURES 1 through 11 differing therefrom only in that the pin 67 of each segment thereof and that the adjacent segment 68 in whose socket 68 the pin is disposed are provided with complementary arcuate radial apertures or bores 105 and 106 in which is located a resilient plug 107 of substantially circular cross section integral with the resilient body 65 and extending radially outwardly therefrom. Each plug is molded and bonded to the adjacent surfaces of each pair of complementary segments and thus closes and seals any gap between the external surface of the outer pin 67 of one segment and the adjacent surfaces of the other complementary segment defining the socket 68 in which the pin 67 is disposed. The plugs yield resiliently to permit pivotal movement of the segments above the axes of their pin and socket connections. Since the plugs extend to the outer surfaces 75 of the bosses and of the pins, and since the line S of the sealing engagement interface extends across the outer surfaces of the plugs, they effectively prevent flow of fluid between the segments of each complementary and interconnected pair of segments, when the seal is in sealing engagement with the internal surfaces of a flow conductor.

Referring now particularly to FIGURE 14, each seal 50 may be fabricated or produced by placing a continuous circle or ring of the pin and socket connected pairs of the complementary segments 66a and 66b in the central cavity 109 of a rotatable mold. The mold has an internal annular recess 111 in which the bosses 70 of the segments are positioned with the outer surfaces 75 of the bosses engaging the internal cylindrical surface 112 of the mold whose radius of curvature is greater than the radius of curvature of the outer surfaces of the bosses which, of course, is that of the flow conductor and that assumed when the seal 50 is in its normal partly retracted position illustrated in FIGURE 4. The opposite end shoulders 76 and 77 of the bosses of the segments engage the shoulders 114 and 115 defining the opposite end sides of the internal recess. The segments are then held against outward and longitudinal displacement relative to the mold and to each other by the frictional engagement of their shoulders 76 and 77 with the shoulders of the mold and against outward displacement by the engagement of their bosses with the surface 112.

The rotatable mold may include two sections 110a and 110b rigidily detachably securable to one another in any suitable manner, as by bolts or the like. The rotatable mold has a horizontal shaft 122 whose axis of rotation is concentric with the axes of the ring of segments in the mold and of the internal annular recess 111 thereof. The mold shaft is of course rotatably mounted on a suitable support and connected to a suitable drive means, such as an electric motor, for rotating the mold. The mold also has a filter aperture 123 in one end thereof through which a predetermined quantity of molten filler substance, such as "Cerrocast" which melts at a temperature of approximately 300 degrees Fahrenheit, can be introduced into the cavity of the mold. A predetermined quantity of the molten or liquid filler substance is introduced into the cavity as the mold is rotated at a speed so high that the centrifugal force imparted to the molten filler substance causes the molten filler substance to move outwardly into the interstices between adjacent longitudinal sides of the bosses of adjacent segments and thereby against the internal surface 112 of the mold recess. The amount of the filler substance introduced into the mold is so chosen that it fills the internal recess between the end shoulders 114 and 115 thereof to a cylindrical plane 126, of the same radius as the radius of curvature of the external surfaces 87 of the outer portions of the resilient body 65, which is spaced inwardly of the surface 112 of the mold and concentric therewith and which extends between and is spaced from the outer surfaces of the end stop portions 71 and 72 of the segments and the outer end edges of the beveled shoulders of the bosses. This cylindrical plane extends through the arcuate recesses 90 and 93 of the segments so that the molten filler substance fills outer portions of the recesses.

The mold is rotated until the filler substance is cooled and solidified forming with the segments an annular rigid body. The two sections of the rotatable mold are then detached from one another and the rigid body of segments and filler substance are removed from the cavity of the rotatable mold and placed in a suitable mold 130, schematically shown in broken lines in FIGURE 2, in which the rubber or other suitable substance is molded to form the resilient annular body 65 and bond it to the segments and the filler substance. The mold 130 may include an outer annular shell 131 formed of two sections 131a and 131b rigidly and detachable connectable to one another and a core 132 which is insertable in the outer shell and rigidily securable thereto in any suitable manner. The outer shell of the mold has an internal annular recess 135 in which are received the bosses of the segments and the filler substance of the rigid body. The annular end shoulders 136 and 137 defining the recess 135 engage the end shoulders 76 and 77 of the segments as well as the end surfaces of the filler substance between the spaced end shoulders of adjacent segments. The shell also has annular surfaces 139 and 140 which extend outwardly of the inner ends of its shoulders 136 and 137, respectively, and which engage the end stop portions 71 and 72 of the segments, and annular surfaces 141 and 142 which extend longitudinally outwardly and radially inwardly from the outer ends of the surfaces 139 and 140, respectively, and then curve inwardly.

The external configuration of the core 132 corresponds to the desired configuration of the internal surfaces of the resilient body 65 of the seal. The shell and the core of the mold thus provide a cavity into which raw rubber or other suitable substance in liquid or viscous state is introduced through a suitable filler aperture 144 to fill all spaces of the mold cavity not occupied by either the filler substance or the segments. Alternatively, if the raw rubber is in a plastic condition, it may be applied to the interior of the rigid band while it is in place in the outer shell and the core is then telescoped into the shell thus compressing the plastic substance to cause it to fill all unoccupied spaces within the mold cavity. Any excess amount of the plastic substance may escape from the cavity through a suitable aperture, such as the aperture 144 provided in the mold shell in the usual manner, which may then be plugged. The rubber or other substance is then cured at a temperature lower than the melting temperature of the filler substance, for example, 275 Fahrenheit when the melting temperature of the filler substance is 300 degrees Fahrenheit, until it acquires its resilient state and forms the resilient body 65 in which the inner portions of the segments disposed inwardly of the cylindrical plane 126 defining the internal surfaces of the filler substance are now embedded and to which they are bonded. The outer shell 130 of the mold is then removed and the assembly of the inner core, the resilient body 65 and the filler substance which still rigidly secures the segments to one another, is placed in an oven and heated to a temperature above the melting point of the filler substance but below the temperature at which the resilient substance of which the resilient body is formed deteriorates and of course below the melting point of the substance of which the segments are formed. Once the filler substance has melted and drained off the segments, the core and the seal 50, which is still positioned on the core are removed from the oven. The seal is then removed longitudinally from the core since its segments are now free to move relative to one another and permit the annular seal to expand as required to permit such removal of the seal from the core.

If it is desired that the seal 50 be provided with resilient plugs 107 to seal the small gaps between adjacent surfaces of the segments defining the pins 67 and the sockets 68, substantially radial holes, which intersect such adjacent surfaces, are drilled through the segments and through the filler substance before the rigid ring formed of the filler substance and the segments are placed in the mold 130. If the substance of which the segments is formed is very hard, the segments are formed with aligned recesses which then define opposite surfaces of the plugs and which are filled with the filler substance in the rotatable mold. The soft filler substance only must then be drilled out of such recesses to form the bores in which the plugs are faced. The plastic substance fills such radial holes in the rigid body and when such plastic substance is cured and the filter substance is subsequently melted, the plugs 107 of resilient substance thus formed close the gaps between adjacent surfaces of complementary connected segments at the pin and socket connections thereof.

It will be apparent that the use of a low melting point metal, centrifugally cast, as a means of filling all the spaces from which the rubber or resilient material is to be excluded, is an efficient but inexpensive method of achieving the final resilient body shape which could not otherwise be molded without an extremely complex and costly mold.

The seal 50 may also be used as a seal element of a swab. For example, the well tool 20 may be easily modified to function as a swab in a flow conduction by replacing the frangible disk 40 with a seat ring, not shown, having an upwardly facing annular seat engagement by a ball valve disposed in the bore 34 of the top retainer section.

If such modified well tool is now lowered through a flow conductor, as by a flexible line, no appreciable pressure differential exists across the seal thereof during such downward movement since the ball valve is moved upwardly in the passage 33 of the top retainer section off the seat of the seat ring into a position above the inner ends of the lateral ports 47 permitting communcation or flow of fluid past the seat through the lateral port 48, the passages 33 the seat ring the passage 34 and the ports 44. The seal 50 thus is not forced toward expanded position by a pressure differential and such modified well tool 20 easily moves downwardly through the flow conductor. When upward movement is then imparted to such modified well tool, the column of liquid in the flow conductor trapped above such well tool causes a downwardly acting pressure differential to be created across the seal 50 since the ball valve moves downwardly into sealing engagement with the seal of the seat ring and prevents flow of fluids downwardly through the ports 47, the passages 33 and 34, and the ports 48. The seal 50 is biased by such pressure differential toward expanded position closing the annulus between the flow conductor and the body of the well tool causing such trapped column of liquid to be moved upwardly in the flow conductor as the well tool is moved upwardly therein.

When the seal 50 is to be used as an element of a swab, the lip 96 being omitted since the seal need seal only if the force of the pressure differential acts in one longitudinal direction therecross.

The thus modified well tool may be employed as a paraffin scraper since the seal 50 will contact as the well tool is moved downwardly upon engaging any deposits of paraffin on the internal surfaces of the well flow conductor since no pressure differential exists thereacross during its downward movement and is expanded and biased outwardly by the pressure differential thereacross as the well tool is moved upwardly into sealing engagement with the internal surfaces of the flow conductor and will thus engage and scrape such paraffin deposits off the internal surfaces of the flow conductor during its upward movement in the flow conductor.

It will also be seen that while the seal 50 has been described as mounted on the body of a well tool which is movable through a flow passage of a flow conductor, the seal tool 50 may be mounted in external recesses of such bodies or pistons movable in the chambers or passages of housings or cylinders of pumps, hydraulic rams and the like to seal between the pistons and such housings or cylinders.

Figure 15:
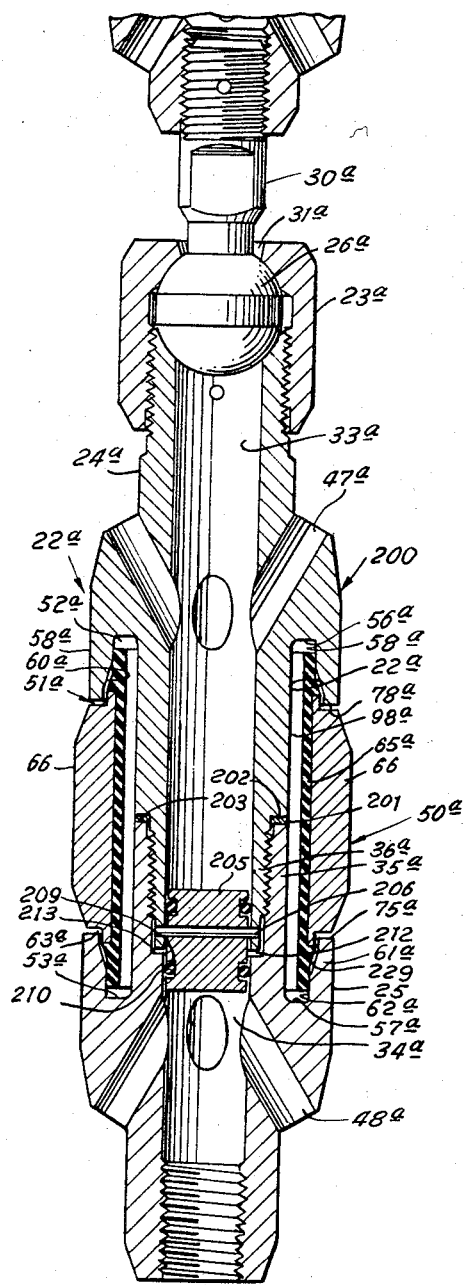
FIGURE 15 is a vertical sectional view of a modified form of the well tool embodying the invention.
Figure 16:
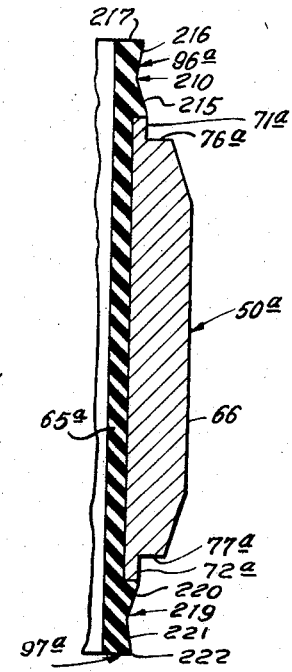
FIGURE 16 is a fragmentary vertical sectional view of the seal illustrated in FIGURE 15.

The modified form of the well tool 200 illustrated in FIGURES 15 and 16 of the drawing is substantially similar in structure and mode of operation to the well tool 20 and, accordingly, elements of the well tool 15 have been provided with the same reference numerals, to which the subscript "A" has been added, as the corresponding elements of the well tool 20. The top and body seal retainer sections 24a and 25a of the well tool 200 are threadedly connected together, the reduced lower end portion 36a of the top retainer section being threaded in the lower end portion 35a of the top retainer section 24a. A suitable toothed lock washer 201 is disposed between the shoulders 202 and 203 of the retainer sections to hold the two retainer sections against accidental rotatable movement relative to one another which could result in the unscrewing of one section from the other.

A plug 205 is positioned in the longitudinal flow passage of the body 22a and is releasably secured to the top retainer section by a shear pin 206 which extends through suitable aligned apertures in the plug and in the top retainer section. A pair of longitudinally spaced O-rings 209 and 210 disposed in suitable external annular recesses of the plug seal between the plug and the top and bottom retainer sections thus preventing flow of fluid between the two sections. The O-ring 209 sealingly engages the internal surface of the top retainer section between the lower ends of the lateral ports 47a and above the annular downwardly facing shoulder 212 thereof while the O-ring 210 sealingly engages the internal surfaces of the bottom retainer section above the upper ends of the lateral ports 48a and the annular end shoulder 213 thereof. The O-rings therefore prevent any flow of fluids into or out of the annular chamber 98a through the threaded connection between the top and bottom retainer sections.

It will be apparent that if the well tool becomes lodged in a well flow conductor, an increase in the fluid pressure in such well flow conductor at one end of the flow conductor which increases the pressure differential across the plug 205 above a predetermined value will cause the shear pin 206 to shear. For example, if the pressure is increased in the flow passage 33a, the plug is moved longitudinally in the passage 34a of the bottom retainer section until its O-ring 209 moves past the inner ends of the lateral ports 48a of the bottom retainer section. Conversely, if the fluid pressure is increased at the other end of the well tool, the plug is moved in the opposite direction in the longitudinal flow passage 33a of the top retainer section 24a until the O-ring 210 moves past the inner ends of the lateral ports 47a. It will thus be seen that the plug 205 has the same functions as the frangible disk 40 of the well tool to permit fluid flow through the body 22a when the pressure differential across the plug exceeds a predetermined value.

The annular seal 50a is substantially similar to the annular seal 50, but the annular end lips 96a and 97a of the seal 50a are of different configurations from the corresponding end lips of the seal 50. Seal lip 96a has an external annular recess 210 defined by annular surface 215 which extends inwardly and upwardly from the ends of the segments and an annular surface 216 which extends upwardly and outwardly to the upper end of the lip and forms an interference edge 217 thereat. The end lip 97a similarly has an annular external recess 219 defined by an annular surface 220 which extends downwardly and inwardly from the ends of the segments and an annular surface 221 which extends outwardly and downwardly to the bottom end of the lip and forms an interference edge 222 thereat.

The seal lips 96a and 97a thus have annular portions of decreased thickness spaced from the ends thereof which ensure that any longitudinal fluting or folding of the resilient body 65a at the portions of the lips located longitudinally outwardly of the ends of the segments caused by the compression of the resilient body 65a will terminate in such annular areas of decreased thickness and will not extend to the end edges of the lips and thus interfere with sealing efficiency of the lips.

The spaced grooves 52a and 53a of the top and bottom retainer section of the well tool 200 which open to the annular external recess 51a of the body 22a are of somewhat different configuration from the corresponding grooves of the body 22 of the well tool 20. The internal outer side of the top groove 52a which is provided by the annular downwardly extending flange 58a includes a cylindrical internal cylindrical seal surface 59a which extends from the downwardly facing annular surface 56a defining the upper end of the groove, the downwardly and outwardly beveled annular intermediate surface 228 and an annular cylindrical stop surface 60a which is engageable by the stop portions 71a and 72a of the segments of the seal which project upwardly into the top groove 52a. The internal outer side of the bottom groove 53a which is similarly provided by the annular upwardly extending annular flange 61a of the bottom retainer section includes the cylindrical annular seal surface 62a which extends from the annular upwardly facing surface 57a which defines the bottom end of the groove, an upwardly and outwardly beveled intermediate surface 229 and a cylindrical stop surface 63a which is engageable by the stop portions 71a and 72a of the segments of the seal which extend downwardly into the bottom groove.

The inherent configuration of the seal lips 96a and 97a, shown in FIGURE 16, is such that when the seal is positioned on the body, the interference edges 217 and 218 and outer portions of the surfaces 216 and 221 engage the seal surfaces 59a and 62a, respectively, and are deformed resiliently inwardly as shown in FIGURE 15. Each end lip 96a and 97a thus prevents flow of fluid from the annular chamber 98a therepast to the exterior of the body but flexes inwardly to permit the flow of fluid from the exterior of the body therepast into the annular chamber 98a.

Longitudinal movement of the seal 50a on the body is limited by the engagement of the opposite horizontal end shoulders 76a and 77a of the bosses of the segments 66a with the shoulders 78a and 79a of the flanges 51a and 61a. The range of longitudinal movement of the seal prevents engagement of the end lips with the shoulders 56a and 57a of the top and bottom grooves.

It will now be apparent that the well tool 200 functions in the same manner as the well tool 20 to close the flow passage of a flow conductor through which it may be movable by a fluid pressure differential existing thereacross. The end lip 96a is held in sealing engagement with seal surface 58a to close the upper end of the chamber 98a, when the seal 50a is moved to its uppermost position on the body by an upwardly acting pressure differential existing thereacross, by the fluid pressure which is admitted to the lower end of the chamber by the inward flexing of the end lip 97a. Conversely, the end lip 97a is held in sealing engagement with the seal surface 62a when the seal 50a is moved to its lowermost position on the body by a downwardly acting pressure differential existing thereacross, by the fluid pressure which is admitted to the end of the upper chamber by the inward flexing of the end lip 96a.

Figure 18:
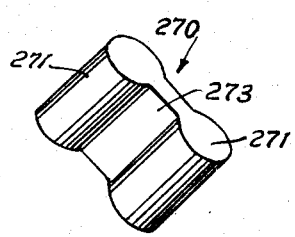
FIGURE 18 is a prospective view of one of the connector links.
Figure 17:
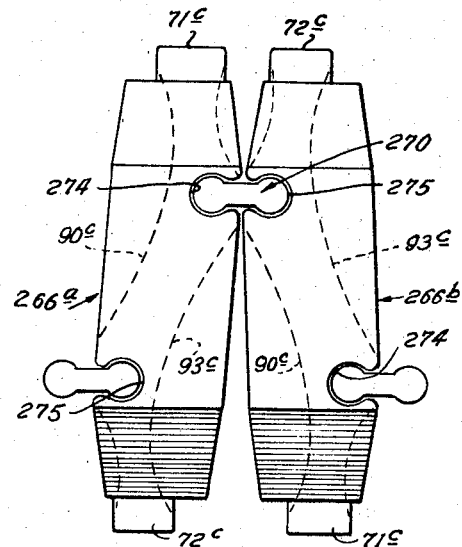
FIGURE 17 is a planar development view showing a modified form of segments pivotally connectable to one another by connector links.

The segments of the seals 50 and 50a may have form and be movably interconnected as shown in FIGURES 17 and 18. The segments 266 are substantially similar in configuration to the segments 66a and 66b and accordingly corresponding elements thereof have been provided with the same reference numerals, to which the subscript "c" has been added as the corresponding elements of the segments 66. Each pair of complementary segments 266a and 266b is connected by a pivot connector link 270 whose arcuate pivot end portions 271 connected by the intermediate portion 273 thereof are receivable in the sockets 274 and 275 of adjacent complementary segments 266a and 266b, respectively. It will be apparent that the each segments 266a and 266b is pivotally connected to adjacent segments for pivotal movement about longitudinally and circumferentially spaced axes in the same manner as the segments 66a and 66b. The axes of pivotal movement of the segments 266 extend perpendicular to, but do not intersect the central axis of the seal. Each such axis of pivotal movement extends parallel to a radial line of the seal. This orientation of the axis of pivotal movement of the pivotally connected adjacent links 66 and 266 relative to one another assures that the segments do not tilt about an axis which extends angularly relative to the radial lines in such manner as to move one of them away from the inner wall of the flow conductor as the seal expands and contracts which would occur if such axis of pivotal movement of the segment were a radial axis which intersected the central longitudinal axis of the seal.

It will also be seen that the seal 50a of a seal having the segment 266 instead of the segment 66 may be produced by the same method as the seal 50.

It will further be seen that while the method of manufacturing the seal employs the use of a liquid or other filler substance, a granular filler substance could be employed which would be moved outwardly in the rotating mold by centrifugal force to fill the interstices between the segments and then compacted or solidified by the addition of an air-hardening or thermosetting plastic fluid with a re-melting temperature higher than the curing temperature subsequently to be used for the rubber molding so that a solid annular body formed of such filler substance and the segments would be formed in the rotatable mold.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. The method of producing a seal having a closed ring of pivotally connected segments disposed about and embedded in a resilient annular body, said method including: connecting a plurality of the segments to form a closed ring of predetermined diameter; filling outer portions of interstices between adjacent segments with a filler substance by centrifugal force to form a rigid annular band with the filler substance covering and shielding radial outer portions of the longitudinal side surfaces of the segments, bonding an annular resilient body to internal surfaces of said rigid band with outer portions of the resilient body extending into the interstices between adjacent segments to the internal surfaces of the filler substance; and removing the filler substance to free the segments for pivotal movement relative to one another whereby said seal is freed to expand and contract radially.

2. The method of producing a seal having an annular resilient body and a plurality of pivotally interconnected segments extending about the resilient seal and bonded thereto, said method including: connecting a plurality of segments to form a closed ring of predetermined diameter; placing the ring of interconnected segments in a mold; introducing a predetermined quantity of liquid filler substance into the mold and rotating the mold to cause the liquid filler substance to be moved outwardly by centrifugal force into the interstices between the segments and fill radially outer portions of the interstices; rotating the mold while the filler substance solidifies to form a rigid annular band formed of said segments and said filler substance; forming a resilient body within the rigid band with the resilient body filling all portions of the interstices between segments not filled by the filler substance; and liquifying the filler substance and removing it from the resilient body and the segments to free the segments for movement relative to one member and the seal for radial contraction and expansion.

3. The method of producing a seal having an annular resilient body and a plurality of pivotally interconnected longitudinally extending segments disposed about the resilient body and bonded thereto said method including: connecting a plurality of segments to form a closed ring of predetermined diameter; placing the ring of interconnected segments in a mold; introducing a predetermined quantity of molten filler substance into the mold; rotating the mold to cause the molten filler substance to be moved outwardly by centrifugal force in to the interstices between adjacent longitudinal sides of the segments and to fill radially outer portions of the interstices; rotating the mold until the molten filler substance cools below its melting temperature and solidifies to form with the segments a rigid annular band; forming a resilient annular body within the rigid band with the resilient body filling all portions of the interstices between the segments not filled by the filler substance; and, raising the temperature of the filler substance to a temperature above its melting temperature to cause the filler substance to drain from the resilient body and the segments to free the segments for movement relative to one another and the seal for radial contraction and expansion.

4. The method of producing a seal having an annular resilient body and a plurality of pivotally interconnected longitudinally extending segments disposed about the resilient body and bonded thereto said method including: connecting a plurality of segments to form a closed ring of predetermined diameter; placing the ring of interconnected segments in a mold; introducing a predetermined quantity of molten filler substance into the mold; rotating the mold to cause the molten filler substance to be moved outwardly by centrifugal force into the interstices between adjacent longitudinal sides of the segments and to fill radially outer portions of the interstices; rotating the mold until the molten filler substance cools below its melting temperature and solidifies to form with the segments a rigid annular band; placing the rigid annular body in a second mold and molding a resilient body of predetermined configuration to and within the rigid band with the resilient body filling all portions of the interstices between segments not filled by the filter substance; removing the rigid annular band and the resilient body molded and bonded thereto from the second mold; and heating the filler substance to a temperature above its melting temperature and below the temperature of deterioration and melting of the resilient body to free the segments for movement relative to one another and the seal for radial expansion and contraction.

5. The method of producing a seal having an annular resilient body and a plurality of pivotally interconnected segments extending about the resilient body and bonded thereto, said method including: connecting a plurality of segments to form a closed ring of predetermined diameter; placing the ring of interconnected segments in a mold; introducing a predetermined quantity of filler substance into the mold and rotating the mold to cause the filler substance to be moved outwardly by centrifugal force into the interstices between the segments and fill radially outer portions of the interstices; rotating the mold while the filler substance solidifies to form a rigid annular band formed of said segments and said filler substance; forming a resilient body within the rigid band with the resilient body filling all portions of the interstices between segments not filled by the filler substance; and removing the filler substance from the resilient body and the segments to free the segments for movement relative to one another and the seal for radial contraction and expansion.

References Cited

UNITED STATES PATENTS

| 843,352 | 2/1907 | McCarthy | 264—261 |
| 1,090,533 | 3/1914 | Heinkel | 164—108 |
| 1,360,165 | 11/1920 | Zenk | 264—261 |
| 1,949,135 | 2/1934 | Wirth | 264—317 X |
| 2,833,009 | 5/1958 | Horst | 164—288 X |
| 3,066,387 | 12/1962 | Herbst | 264—277 X |

FOREIGN PATENTS

| 1,135,162 | 8/1962 | West Germany. |

U.S. Cl. X.R.

264—270, 277, 317; 18—36, 26; 164—288, 114

PO-1050
(5/69)

UNITED STATES PATENT OFFICE
CERTIFICATE OF CORRECTION

Patent No. 3,420,928                     Dated January 7, 1969

Inventor(s) Norman F. Brown

It is certified that error appears in the above-identified patent and that said Letters Patent are hereby corrected as shown below:

```
col.  6, line 62, cancel "the"
col.  6, line 67, for "betwen" read --between--
col.  7, line 74, for "wall" read --well--
col.  9, line 46, for "expansions" read --expansion--
col. 12, line 40, for "conduction" read --conductor--
col. 16, line 13, for "member" read --another--
col. 16, line 56, for "filter" read --filler--
```

SIGNED AND
SEALED

APR 7 1970

(SEAL)
Attest:

Edward M. Fletcher, Jr.
Attesting Officer

WILLIAM E. SCHUYLER, JR.
Commissioner of Patents